US008997210B1

(12) United States Patent
Kaplan et al.

(10) Patent No.: US 8,997,210 B1
(45) Date of Patent: Mar. 31, 2015

(54) LEVERAGING A PERIPHERAL DEVICE TO EXECUTE A MACHINE INSTRUCTION

(71) Applicants: Advanced Micro Devices, Inc., Sunnyvale, CA (US); ATI Technologies ULC, Markham (CA)

(72) Inventors: David A. Kaplan, Austin, TX (US); Philip Ng, Toronto (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/052,182

(22) Filed: Oct. 11, 2013

(51) Int. Cl.
  *G06F 7/04* (2006.01)
  *G06F 13/36* (2006.01)
  *G06F 21/85* (2013.01)
  *G06F 3/00* (2006.01)

(52) U.S. Cl.
  CPC .......... *G06F 21/85* (2013.01); *G06F 3/002* (2013.01)
  USPC ............................. 726/17; 726/26; 710/305

(58) Field of Classification Search
  USPC ........................... 726/17, 26; 710/305
  See application file for complete search history.

(56) References Cited

U.S. PATENT DOCUMENTS

| 4,539,655 | A * | 9/1985 | Trussell et al. ............... 710/100 |
| 4,622,631 | A * | 11/1986 | Frank et al. ............................ 1/1 |
| 2006/0076396 | A1* | 4/2006 | Lima et al. ..................... 235/375 |
| 2009/0077403 | A1* | 3/2009 | Hayashi et al. ............... 713/320 |

* cited by examiner

*Primary Examiner* — Techane Gergiso

(57) ABSTRACT

A method includes executing microcode in a processing unit of a processor to implement a machine instruction, wherein the microcode is to manipulate the processing unit to access a peripheral device on a public communication bus at a private address not visible to other devices on the public communication bus and not specified in the machine instruction. A processor includes a public communication bus, a peripheral device coupled to the public communication bus, and a processing unit. The processing unit is to execute microcode to implement a machine instruction. The microcode is to manipulate the processing unit to access a peripheral device on a public communication bus at a private address not visible to other devices on the public communication bus and not specified in the machine instruction.

20 Claims, 4 Drawing Sheets

LEVERAGING A PERIPHERAL DEVICE TO EXECUTE A MACHINE INSTRUCTION

BACKGROUND

1. Field of the Disclosure

The disclosed subject matter relates generally to computing systems and, more particularly, to a method and apparatus for implementing a machine instruction using a peripheral device.

2. Description of the Related Art

Computer processors employ various computational resources to implement machine instructions embodied in software. A machine instruction received by a central processing unit (CPU) core is decoded and provided to an execution unit for implementation. The execution unit uses microcode instructions to translate machine instructions into sequences of detailed circuit-level operations. Thus, the microcode serves as a bridge between the machine instructions, which may be the same for any number of CPU micro-architectures, and the specific circuit-level operations that are implemented by the CPU core to achieve the result intended by the machine instruction. Generally, microcode is customized to a particular processor micro-architecture.

In some cases it may be difficult to implement a particular machine instruction using microcode due to the complexity of the required operations. In such cases, it may be useful to employ an external computational resource for performing the actual calculations required to implement the machine instruction. In this context, external implies external to the CPU core containing the execution unit. The external computing resource may also be external to the integrated circuit device implementing the CPU core, or it may be part of the same integrated circuit device.

Various topologies exist for interfacing the processor core with an external computational resource. In one example, a dedicated communication bus may be provided between the CPU core and the external computational resource. Providing a dedicated bus increases the complexity of the system and generally increases cost. In another example, an existing public communication bus in the computer system may be employed for communicating with the external computational resource. The use of a public bus provides security challenges as a malicious entity may monitor the public bus and possibly interfere with the communication on the public bus.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-4 illustrate example techniques for using a peripheral device to implement a machine instruction received by a processing unit. The peripheral device is assigned a private address on a public communication bus. The private address is not visible to other entities using the public communication bus, but rather, only to the processing unit. Microcode employed to manipulate the processing unit to implement the machine instruction accesses the peripheral device using the private address rather than an address specified in the machine instruction. Using a private address allows the public communication bus to be used without sacrificing security. In some embodiments, private registers in the processing unit and in the peripheral controller that supports communication over the public communication bus may be used to record the private address assigned to the peripheral device. The microcode manipulates the processing unit to retrieve the private address from the private register in the processing unit. The use of a private address that is stored in the private register allows flexibility in assigning the private address within the memory addressing scheme employed for the public communication bus while still providing security for the communication.

Figure 1:
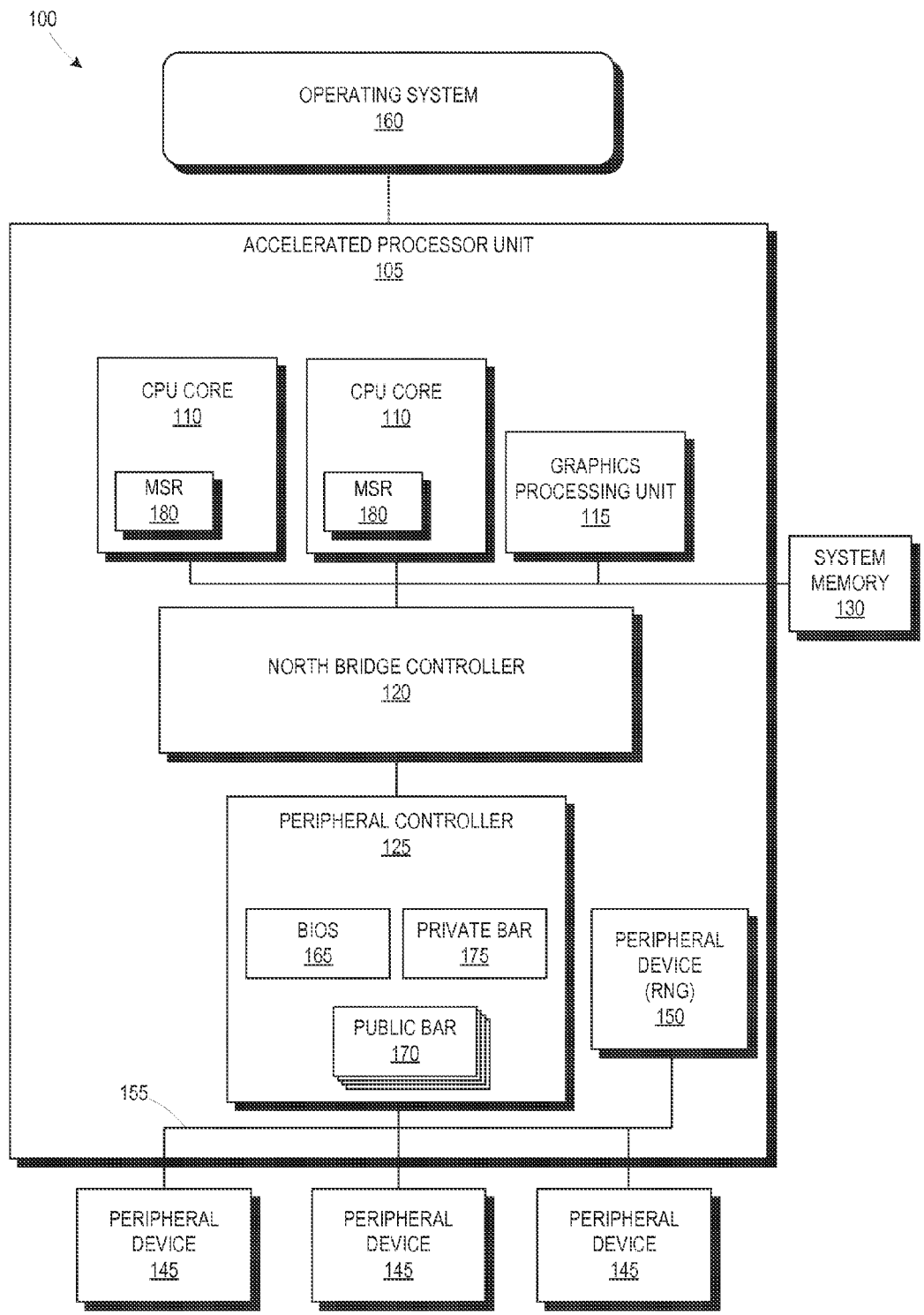
FIG. 1 is a simplified block diagram of a computer system configured to employ implement a machine instruction by accessing a peripheral device at a private address, according to some embodiments.

FIG. 1 is a block diagram of a computer system 100 including an accelerated processing unit (APU) 105, in accordance with some embodiments. The APU 105 includes one or more central processing unit (CPU) cores 110 (referred to generically as processing units), a graphics processing unit (GPU) 115, a north bridge (NB) controller 120, and a peripheral controller 125. The NB controller 120 provides an interface to the peripheral controller 125 and to system memory 130. In some embodiments, the computer system 100 may interface with one or more peripheral devices 145, 150 via the peripheral controller 140. The peripheral devices 145 may be external to the APU 105, and the peripheral device 150 may be integrated therein. In one embodiment, the peripheral device 150 may be integrated with the peripheral controller 125. The peripheral controller 125 supports communication with the peripheral devices 145 over a public communication bus 155. The operation of the computer system 100 is generally controlled by an operating system 160 including software that interfaces with the various elements of the computer system 100. A basic input/output system ("BIOS") memory 165 in the peripheral controller 125 stores instructions for configuring the computer system 100 during an initialization or boot process, as will be described in greater detail below.

In various embodiments, the computer system 100 may be a personal computer, a laptop computer, a handheld computer, a tablet computer, a mobile device, a telephone, a personal data assistant ("PDA"), a server, a mainframe, a work terminal, a music player, a smart television, a game console, and the like. To the extent certain example aspects of the computer system 100 are not described herein, such example aspects may or may not be included in various embodiments without limiting the spirit and scope of the embodiments of the present application as would be understood by one of skill in the art.

A CPU core 110 receives machine instructions embodied in one or more software applications executed by the APU 105. The machine instructions are decoded and the CPU core 110 translates the machine instruction into one or more microcode instructions for implementation. The microcode instructions represent sequences of detailed circuit-level operations necessary to implement the machine instruction.

The peripheral device 150 is capable of performing various a function to support the CPU core 110 to allow the CPU core 110 to employ the peripheral device 150 to implement a machine instruction referencing the function, thereby obviating the need to execute the elements of the function itself. The particular function implemented by the peripheral device 150 may vary. In some embodiments, the function performed by the peripheral device 150 may be that of a random number or pseudo-random generator. Due to the complexity of the random number generation process and the need for low latency, it is useful to use a processing resource separate from the CPU cores 110 to implement a random number generator. In general, higher quality random numbers require additional processing resources. Various techniques for generating random numbers are known to those of ordinary skill in the art, so they are not described in detail herein. Random numbers are often used for security processes, such as encryption, so the communication between the processor cores 110 and the peripheral device should be private to ensure the integrity of the communication. Because the peripheral device 150 is coupled to the public communication bus 155, a bus that is conventionally not secure, additional measures are taken to establish private communication between the CPU cores 110 and the peripheral device 150.

In some embodiments, the public communication bus 155 may be a peripheral component interconnect express ("PCIe") bus as defined by industry standards known to those of ordinary skill in the art. In a PCIe topology, peripheral devices are assigned addresses similar to memory addresses, a technique referred to as memory mapped input/output (MMIO). The public communication bus 155 is public in the respect that the operating system 160, peripheral devices 145, 150 on the bus 155, and other entities in the computer system 100 may identify the addresses assigned to the peripheral devices 145, 150. During system initialization, the boot instructions in the BIOS 165 are executed to set up the MMIO address space. The peripheral controller 125 includes a plurality of public base address registers ("public BARs," or generically public registers) 170 for storing public addresses associated with each peripheral device 145, 150. Depending on the particular implementation of the peripheral device 145, 150, it may have one or more associated public BARs 170. Using an MMIO addressing scheme, a particular peripheral device 145, 150 is accessed by read or write instructions targeting the assigned public address(es) of the peripheral device 145, 150. The operating system 160 (or a hypervisor in an embodiment implementing virtual machines) reads the public BARs 170 and the public addresses stored therein to identify the system configuration. The operating system 160 may choose to change one or more of the public addresses by overwriting the initial values stored in the public BARs 170 by the BIOS 165. For example, if a new peripheral device 145 is coupled to the public communication bus 155 (referred to as a hot plug event), the operating system 160 assigns a public address in a public BAR 170 to the new peripheral device 145. To accommodate the new peripheral device 145, the operating system 160 may change the public addresses assigned to one or more of the existing peripheral devices 145, 150.

To provide private communication between the processor cores 110 and the peripheral device 150, the peripheral controller 125 includes a private BAR 175. The BIOS 165 assigns a private address to the peripheral device 150 during system initialization and locks the private BAR 175 to prevent it from being subsequently overwritten. Locking the private BAR 175 prevents software, such as the operating system 160 or other software from changing the value. After an event, such as a system reset, the BIOS 165 may change the value stored in the private BAR 175. The peripheral device 150 may have both a public address stored in a public BAR 170 and a private address stored in the private BAR 175. The BIOS 165 reserves a range of private addresses in the MMIO space and informs the operating system 160 of that reserved address range. When changing the public addresses of any of the peripheral devices 145, 150, the operating system 160 is precluded from using any of the addresses in the reserved range so that the private address cannot be allocated to a different peripheral device 145, 150. The BIOS 165 also writes the private address of the peripheral device 150 into a model specific register 180 (i.e., an architectural register) of the for each CPU core 110. The MSR 180 may also be locked by the CPU cores 110 to prevent the value stored therein from being changed by any entity in the computer system 100 after it has been configured by the BIOS 165. In this manner, the private address assigned to the peripheral device 150 is established during system initialization and cannot be changed thereafter. The MSR 180 informs the associated CPU core 110 of the private address of the peripheral device 150 to allow microcode in the CPU core 110 to use the address in implementing a machine instruction, as described in greater detail below.

The address stored in the private BAR 175 is considered private in comparison to the address stored in the public BAR 170 because it is not visible to the operating system 160 or the other devices coupled to the public communication bus 155. The public BARs 170 and private BAR 175 may be selected from the same general pool of registers, but a bit may be set for the private BAR 175 indicating its private nature. The operating system 160 may be configured to ignore registers with their private bits set, or the peripheral controller 125 may be configured to not report private BARs 175 responsive to queries from the operating system 160.

A CPU core 110 may access the peripheral device 150 by reading the MSR 180 to determine the private address and then using the private address to access the peripheral device 150. In the context of the example where the peripheral device 150 implements a random number function, the CPU core 110 (using its microcode) may read the current random number by accessing the peripheral device 150 at the private address. The peripheral device 150 periodically changes the value of the random number after it is read so that it has a different value each time it is read. The peripheral device 150 may implement a queue of random numbers (e.g., a first-in-first-out (FIFO) buffer) to allow successive random number instructions to retrieve a new random number, even if the access rate is greater than the time required for the peripheral device 150 to generate a new random number. If the queue is empty, the completion of the random number instruction may be delayed until a new number is available.

In some cases, there may be a predetermined offset between a base address of the peripheral device 150 and the location at which the results of the arithmetic function performed by the peripheral device (e.g., the random number) is stored. The CPU core may add this predetermined offset to the private address stored in the MSR 180 to determine the address at which to read the random number. In a general case, the arithmetic function performed by the peripheral device may include one or more input operands specified in the machine instruction and provided by the CPU core 110 to the peripheral device 150. The CPU core 110 may use a first offset or first set of offsets from the base private address in one or more write commands to store the operand(s). Subsequently, the CPU core 110 may use a second offset to identify a location for retrieving the result of the arithmetic operation using a load command. In some embodiments, the peripheral device 150 may overwrite the operand with the result of the arithmetic operation, so the first and second offsets may be the same.

Figure 2:
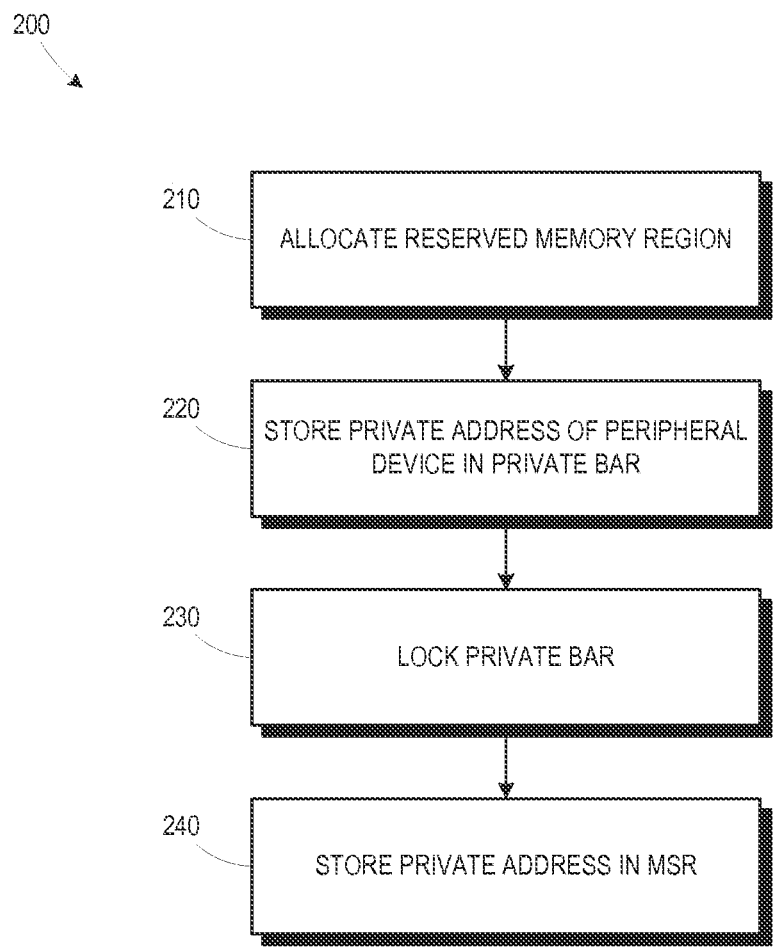
FIG. 2 is a flow diagram of a method for allocating a private address to the peripheral device of FIG. 1, according to some embodiments.

FIG. 2 is a flow diagram of a method 200 employed by the BIOS 165 for allocating a private address to the peripheral device 150, in accordance with some embodiments. In method block 210, a reserved memory region is reserved for one or more private addresses. The memory addresses in the reserved region may not be used by the operating system 160 for assigning to a peripheral device. In method block 210, the private address of the peripheral device 150 is stored in the private BAR 175. In method block 220, the private BAR 175 is locked. As a result, software executed after the system initialization may not change the value stored in the private BAR 175. In some embodiments, the peripheral controller 125 may identify a subsequent attempt write to the private BAR 175 as a security exception and return an error code or interrupt. The BIOS 165 stores the value of the assigned private address in the MSR 180 in method block 230. Hardware or software may lock the MSR 180 to prevent it from being overwritten. For example, the APU 105 may allow a write to the MSR 180 if it has a zero value. If the APU 105 receives a subsequent write to the MSR 180, and it has a non-zero value, it returns an error.

Figure 3:
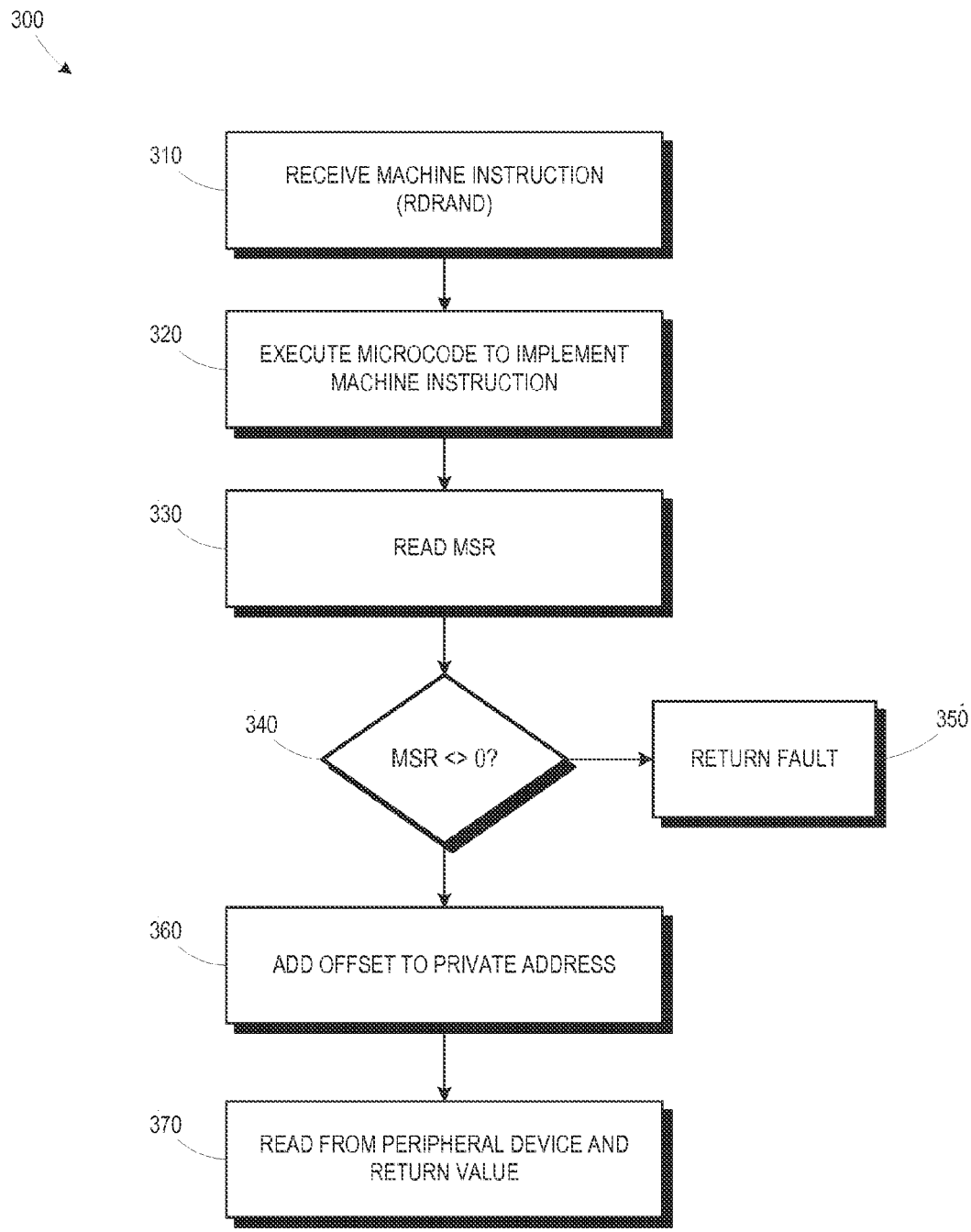
FIG. 3 is a flow diagram of a method for implementing a machine instruction using the peripheral device of FIG. 1, according to some embodiments.

FIG. 3 is a flow diagram of a method 300 employed by the CPU core 110 for implementing a machine instruction using the peripheral device 150. In method block 310, a machine instruction is received. For example, the machine instruction may be an RDRAND instruction. In method block 320, the CPU core implements the machine instruction using microcode. Method blocks 330-370 represent the actions defined in the microcode to manipulate the CPU core 110 to implement the machine instruction. In method block 330, the CPU core 110 reads the MSR 180 to retrieve the private address of the peripheral device 150. If the private address in the MSR 180 has a zero value in method block 340, indicating that it was not initialized, the CPU core 110 returns a fault or error code in method block 350. If the private address in the MSR 180 has a non-zero value in method block 340, the CPU core 110 adds a predefined offset (if necessary) to the private address in method block 360. In method block 370, the CPU core 110 reads from the peripheral device 150 using the private address plus the offset to retrieve the random number and returns the value as the result of the RDRAND machine instruction. In some cases, multiple reads may be performed. The use of the MSR 180 to store the private address simplifies the microcode necessary to implement the machine instruction. The location of the MSR 180 and the required offset to the private address may be fixed in the microcode. The connection between the private BAR 175 and the MSR 180 allows flexibility in assigning the private address by the BIOS 165. Thus, the private address range reserved by the BIOS 165 and the particular private address assigned to the peripheral device 150 may vary depending on the specific implementation of the computer system 100, such as the size of the system memory 130 and the number of peripheral devices 145, 150.

In some embodiments, the private address may be fixed in the microcode, as opposed to being dynamically set using the private BAR 175 and the MSR 180. For example, the computer system 100 may be an embedded system with fixed memory characteristics. In this case, the BIOS 165 may reserve a predetermined private address for the peripheral device 150 within the MMIO address space. In response to receiving a machine instruction requiring the peripheral device 150, the microcode simply translates the machine instruction into a read command targeting the private address plus any necessary offset. Additional offsets may be used with load commands targeting the peripheral device 150 to provide operands thereto, if necessary.

The use of the private address by the microcode, whether stored in the MSR 180 or fixed in the microcode, improves the security associated with the communication between the CPU core 110 and the peripheral device 150. The private address is not specified in the machine instruction and is not visible to other devices in the computer system 100. This situation makes it more difficult for a malicious software application to monitor or corrupt the communication.

In some embodiments, at least some of the functionality described above may be implemented by one or more processors executing one or more software programs tangibly stored at a non-transitory computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 4:
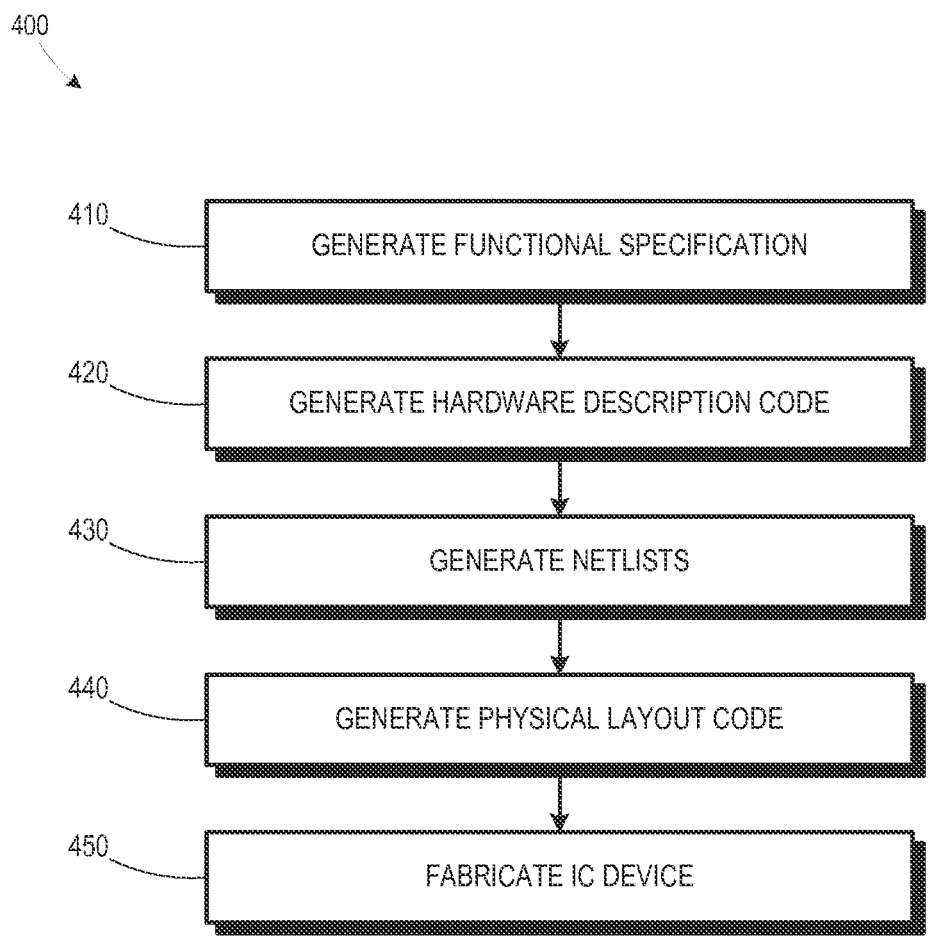
FIG. 4 is a flow diagram illustrating a method for designing and fabricating an integrated circuit device implementing at least a portion of a component of a processor, according to some embodiments.

FIG. 4 is a flow diagram illustrating an example method 400 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 410 a functional specification for the IC device is generated. The functional specification (often referred to as a micro architecture specification (MAS)) may be represented by any of a variety of programming languages or modeling languages, including C, C++, SystemC, Simulink, or MATLAB.

At block 420, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 430 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 440, one or more EDA tools use the netlists produced at block 430 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 450, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes storing architectural state data associated with a processing unit in a cache memory using an allocate without fill mode.

As disclosed herein, in some embodiments a method includes executing microcode in a processing unit of a processor to implement a machine instruction, wherein the microcode is to manipulate the processing unit to access a peripheral device on a public communication bus at a private address not visible to other devices on the public communication bus and not specified in the machine instruction.

As disclosed herein, in some embodiments a processor includes a public communication bus, a peripheral device coupled to the public communication bus, and a processing unit. The processing unit is to execute microcode to implement a machine instruction. The microcode is to manipulate the processing unit to access a peripheral device on a public communication bus at a private address not visible to other devices on the public communication bus and not specified in the machine instruction.

As disclosed herein, in some embodiments a non-transitory computer readable media stores code to adapt at least one computer system to perform a portion of a process to fabricate at least part of a processor. The processor includes a public communication bus, a peripheral device coupled to the public communication bus, and a processing unit. The processing unit is to execute microcode to implement a machine instruction. The microcode is to manipulate the processing unit to access a peripheral device on a public communication bus at a private address not visible to other devices on the public communication bus and not specified in the machine instruction.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method, comprising:
executing microcode in a processing unit of a processor to implement a machine instruction, wherein the microcode is to manipulate the processing unit to access a peripheral device on a public communication bus at a private address not visible to other devices on the public communication bus and not specified in the machine instruction.

2. The method of claim 1, wherein the microcode is to manipulate the processing unit to read the private address from an architectural register associated with the processing unit.

3. The method of claim 1, further comprising:
storing the private address in a private register of a peripheral controller coupled to the public communication bus and the architectural register.

4. The method of claim 3, further comprising:
locking the private register in the peripheral controller.

5. The method of claim 3, further comprising:
storing a public address associated with the peripheral device in a public register of the peripheral controller.

6. The method of claim 3, further comprising:
reserving a range of private addresses including the private address; and
communicating the reserved range to an operating system controlling the processing unit.

7. The method of claim 3, further comprising:
signaling an error to the processing unit responsive to detecting an attempted write to the private register.

8. The method of claim 1, wherein the peripheral device is to generate a random number, and wherein accessing the peripheral device comprises reading the random number at the private address.

9. The method of claim 1, wherein accessing the peripheral device comprises:
writing an operand to the peripheral device at the private address plus a first offset; and
reading a result of an arithmetic operation performed by the peripheral device based on the operand at the private address plus a second offset.

10. A processor, comprising:
a public communication bus;
a peripheral device coupled to the public communication bus; and
a processing unit to execute microcode to implement a machine instruction, wherein the microcode is to manipulate the processing unit to access a peripheral device on a public communication bus at a private address not visible to other devices on the public communication bus and not specified in the machine instruction.

11. The processor of claim 10, wherein the processing unit comprises an architectural register for storing the private address, and the microcode is manipulate the processing unit to read the private address from the architectural register.

12. The processor of claim 10, further comprising:
a peripheral controller coupled to the public communication bus and comprising a private register associated with the peripheral device; and
a basic input output system (BIOS) memory to store instructions, that when executed by the processing unit store the private address in the private register and in the architectural register.

13. The processor of claim 12, wherein the instruction in the BIOS memory, when executed, to lock the private register in the peripheral controller.

14. The processor of claim 12, wherein the peripheral controller further comprises a public register, and the basic input output system unit is to store a public address associated with the peripheral device and visible to other devices on the public communication bus in the public register.

15. The processor of claim 12, wherein the peripheral controller is to signal an error to the processing unit responsive to detecting an attempted write to the private register.

16. The processor of claim 10, wherein the peripheral device is to generate a random number, and the microcode is operable to read the random number at the private address.

17. The processor of claim 10, wherein the microcode is to write an operand to the peripheral device at an address based on the private address and a first offset and read a result of an arithmetic operation performed by the peripheral device from an address based on the operand at the private address and a second offset.

18. The processor of claim 10, wherein the private address is fixed in the microcode.

19. A non-transitory computer readable media storing code to adapt at least one computer system to perform a portion of a process to fabricate at least part of a processor, the processor comprising:
a public communication bus;
a peripheral device coupled to the public communication bus; and
a processing unit to execute microcode to implement a machine instruction, wherein the microcode is to manipulate the processing unit to access a peripheral device on a public communication bus at a private address not visible to other devices on the public communication bus and not specified in the machine instruction.

20. The non-transitory computer readable storage media of claim 19, wherein the processor further comprises:
a peripheral controller coupled to the public communication bus and comprising a private register associated with the peripheral device; and
a basic input output system (BIOS) memory to store instructions, that when executed by the processing unit store the private address in the private register and in the architectural register.

* * * * *